United States Patent [19]

Karlstrom

[11] 4,414,661
[45] Nov. 8, 1983

[54] APPARATUS FOR COMMUNICATING WITH A FLEET OF VEHICLES

[75] Inventor: Krister Karlstrom, Stockholm, Sweden

[73] Assignee: Trancom AB, Sodertalje, Sweden

[21] Appl. No.: 279,837

[22] Filed: Jul. 2, 1981

[51] Int. Cl.³ .............................. H04J 3/02; H04J 3/06
[52] U.S. Cl. ..................................... 370/95; 370/100; 370/110.1; 455/33
[58] Field of Search ................... 370/95, 85, 100, 104, 370/91, 110.1, 111; 179/2 EB; 455/33

[56] References Cited

U.S. PATENT DOCUMENTS 3,310,741  3/1967  Ultermark et al. .................... 455/33
3,878,512  4/1975  Kobayashi et al. ................... 370/91
4,234,952  11/1980 Gable et al. ........................... 370/85

FOREIGN PATENT DOCUMENTS 2739561  3/1979  Fed. Rep. of Germany ........ 455/33

OTHER PUBLICATIONS

"Radio Subscriber Loop System for High-Speed Digital Communications" by Shindo et al., 1981 International Conference on Communications, Denver, Colo., (Jun. 14–18, 1981).

Primary Examiner—Douglas W. Olms
Attorney, Agent, or Firm—Yount & Tarolli

[57] ABSTRACT

A communication system is disclosed wherein plural base stations each communicate with plural associated mobile stations in a variable but well disciplined single channel time division multiplexing arrangement. Each base station communicates to and from its associated mobile stations in an associated unitary communication cycle having time segments of variable size but allotted for specific purposes. The mobile stations include clocks which are all periodically synchronized by the base station. The base station transmits cycle timing information at the beginning of each cycle so that the mobiles can determine by referring to their clocks when the various cycle segments begin and end. The number of mobile stations participating in a communication cycle with a given base station can vary as the mobiles move from the service area of one base station to the next. A particular time segment of each cycle is allocated for use by nonparticipating mobiles to transmit requests for participation in the cycles of the associated base station. The mobiles wait a random delay before transmitting their requests in order to reduce the danger of interfering transmissions of two mobiles both requesting participation in the same segment. A central traffic control center mediates the operation of the system, causing the communication cycles of adjacent base stations to occur sequentially rather than concurrently to avoid interference.

8 Claims, 9 Drawing Figures

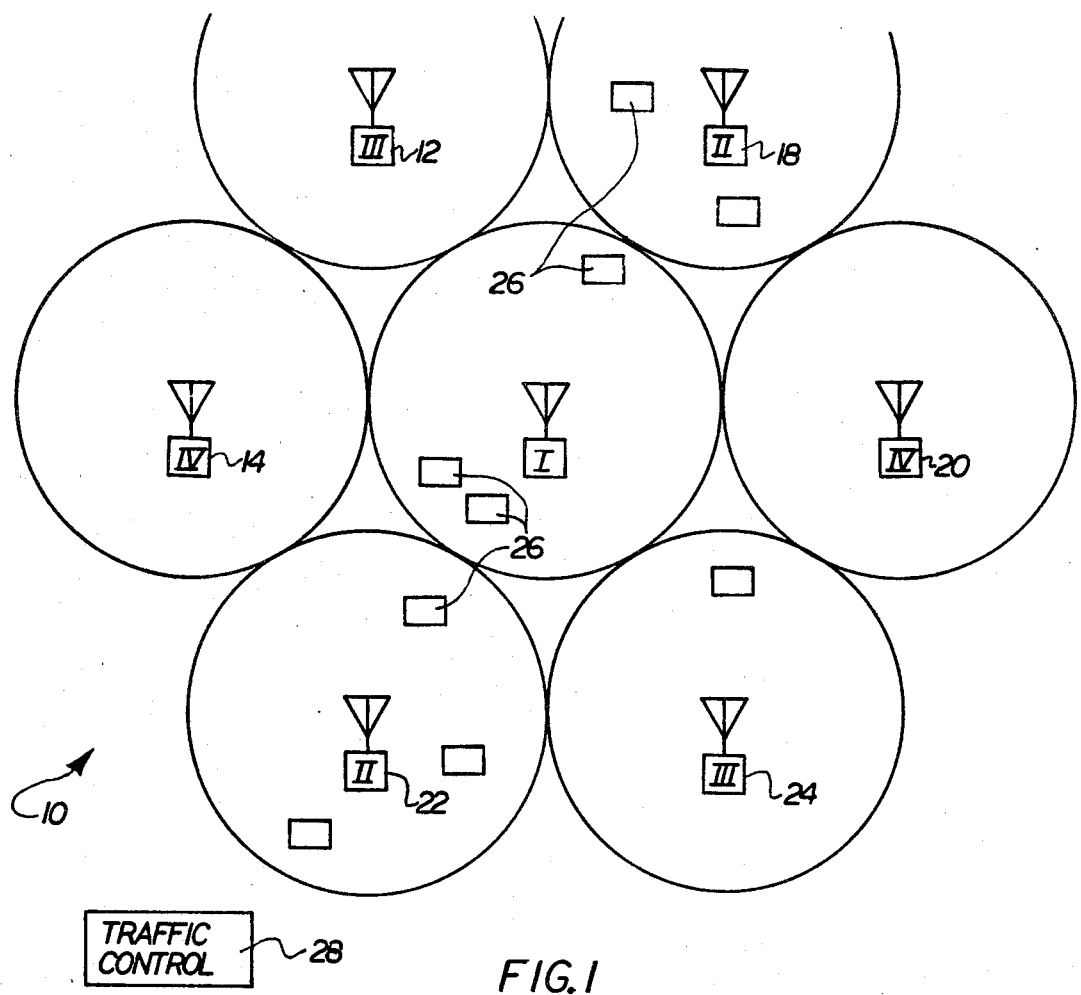
FIG. 1
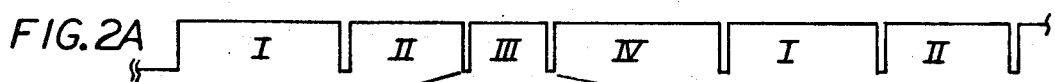
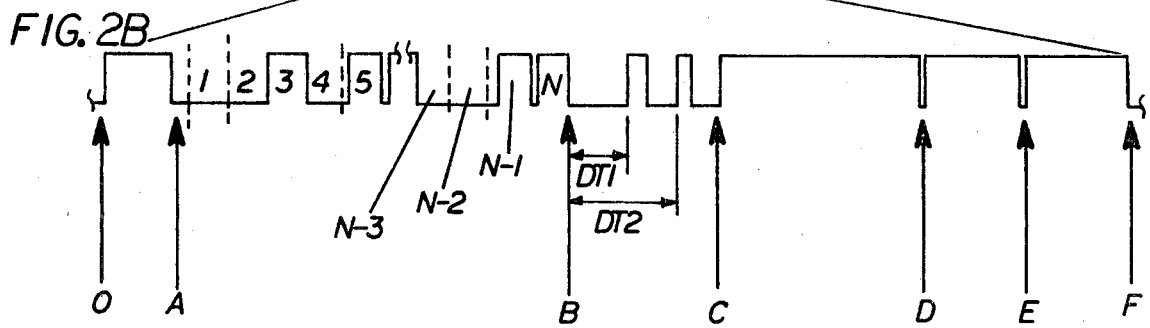

APPARATUS FOR COMMUNICATING WITH A FLEET OF VEHICLES

BACKGROUND AND FIELD OF THE INVENTION

The present invention relates to the art of communicating by radio between plural stations, and more particularly to apparatus for use in communicating data and voice information between a fleet of vehicles and one or more base stations.

Radio communication equipment is often employed to communicate necessary information between the individual vehicles of a fleet of such vehicles (e.g., taxi cabs, delivery trucks, police cruisers, etc.) and their central dispatching station. Although often more than a single radio channel is employed for communicating between these individual vehicles (usually referred to hereinafter as "mobiles") and the central station (usually referred to hereinafter as the "base" station), confusion may nonetheless result when two or more of the mobiles attempt to communicate with the base station at a given time. It would be desirable to keep closer watch on the operation of the mobiles, and to utilize the radio communications network for this purpose. However, this would further complicate the already difficult communications problem associated with maintaining contact with the fleet of mobile stations.

In the past, systems have been devised for automatically communicating desired information from the mobile stations to the base station by means of a time division multiplexing technique. In this technique, each mobile station transmits information to the base station during an associated allotted time slot. Since each of the mobiles transmits only during its own time slot, and since these time slots are not overlapping, it is possible to use a single radio frequency channel for all of the communications.

To successfully accomplish this, of course, it is necessary to synchronize the transmission times for the various mobile stations so that no overlapping of transmissions occurs. In a system disclosed in the patent to Chisholm, U.S. Pat. No. 3,419,865, each of the mobile stations includes a highly accurate, crystal controlled clock which drifts at a very low rate. Due to the low drift rate associated with this clock, adjustments in the clock timing to maintain system synchronization are only infrequently required. When clock timing adjustment is required, however, it is necessary for the operator to manually advance or retard the timing of the clock so as to appropriately adjust the transmission time slot.

In another system currently in operation in Sweden, the base station periodically transmits a synchronizing signal which synchronizes the clocks included in each of the mobile units, thereby automatically readjusting their timing. This approach is preferable, since it does not require intervention by the operator of the mobile unit.

There are occasions in which the desired service area of the communication system is greater than the transmission range of one base station. To properly cover this service area, it is necessary to include two or more base stations. This substantially complicates the problem of communicating with the plural mobile units of the fleet. Thus, if all of the base stations use the same frequency, their transmission will interfere. The Chisholm method of using permanently assigned, non-overlapping time slots may still be used, however this provides inefficient use of the channel, lacks flexibility, and permits only one way communication. If, on the other hand, each base station has a unique associated frequency channel, then the mobile stations (which may move freely from the service area of one base station to another), must include provisions for switching their radio communications between the plural RF channels.

An additional problem relates to the entry of new mobile units into the field. If the Chisholm method of permanently assigning each of the mobile units a specified time slot is used, it will always be necessary to provide as many time slots as the maximum number of vehicles which can ever be fielded. It would be preferable to allot a time slot to a given vehicle only upon its entry into the field. In this case, however, some method must be provided for entering the new vehicle into the communication cycle without interfereing with the communications taking place between the other vehicles already participating in the net.

SUMMARY OF THE INVENTION

The system described hereinafter permits two-way communication between plural base stations and plural mobile stations on a single communication channel by using a central host computer to mediate the times of operations of the various base stations and their associated mobiles. This insures that there is no overlap of transmissions of these base stations or of the mobile units associated with each station. Each base station communicates with its participating mobiles in a well disciplined communication cycle where transmissions to and from the mobiles are sequenced in an ordered but very flexible time division multiplexing scheme.

Each mobile unit monitors the signal received from its associated base station and determines when the level of that signal is becoming unacceptably low. When this occurs, the mobile station monitors the communications cycles of stations other than its own base station, requesting entry into the communication cycles of one of the base stations having a more acceptable signal level. A mobile unit seeking participation in a communication cycle associated with a particular base station transmits its request within a preassigned time interval allocated for this purpose. To prevent interference between several mobile units all requesting participation in the communication cycle during the same time interval, each mobile unit waits a random time delay after the beginning of that time interval before initiating its request for entry into the system. Since the time delays are random, the chances of a conflict occurring between several mobile units is substantially reduced.

BRIEF DESCRIPTION OF THE DRAWINGS

The foregoing and other objects and advantages of the present invention will become more readily apparent from the following detailed description, as taken in conjunction with the accompanying drawings wherein:

FIG. 1 is a diagrammatic representation of one possible spatial distribution of the base stations in a system employing the teachings of the present invention;

FIGS. 2A and 2B are timing diagrams useful in understanding the communication cycles of the system in accordance with the teachings of the present invention;

DETAILED DESCRIPTION

Figure 3:
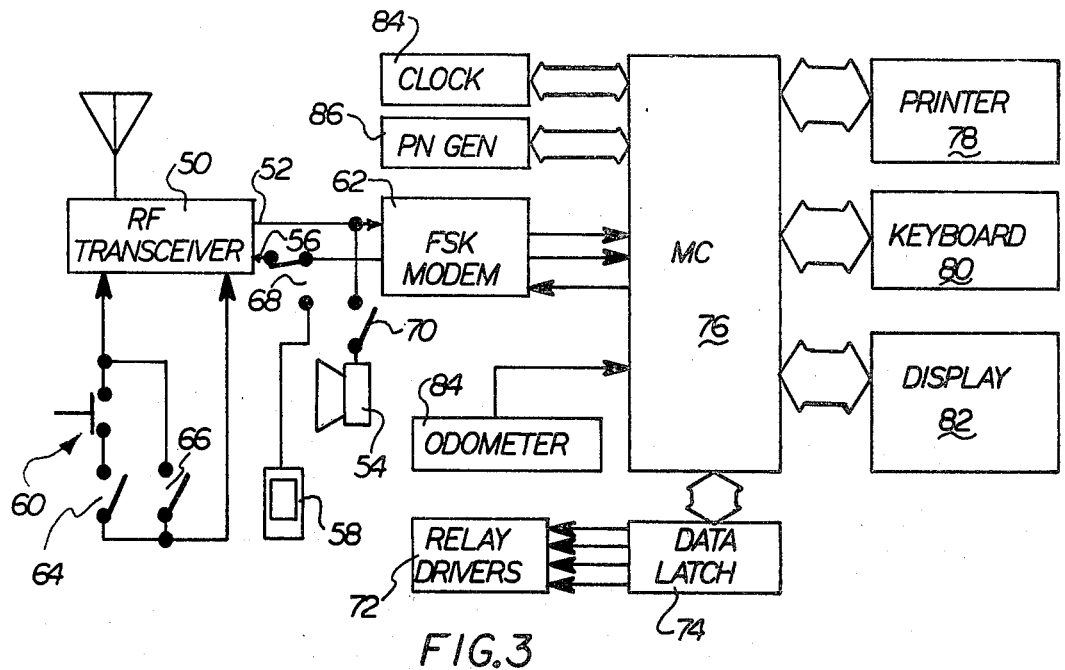
FIG. 3 is a block diagram of the circuitry included in each mobile unit.

The following is a detailed description of one embodiment of a communication system in accordance with the present invention. It will be appreciated that this description is not intended to be exhaustive since many other embodiments are also possible.

Often, the area which is to be serviced by a radio communications system is larger than the area over which radio communication can be effectively accomplished via a single base station. In this situation, an array of base stations would be used rather than only one. FIG. 1 is a graphical representation of one such array of base stations, wherein seven base stations 12-24 are used to effect radio communication with a fleet of vehicles 26 over an area much greater than could be serviced by any one of the base stations individually.

The service areas represented by each of these base stations is indicated in FIG. 1 by the circles drawn concentrically about each associated base station. Of course, the radio signals generated by each base station do not end abruptly at each of these boundaries, but instead extend at least partially into the service area represented primarily by another base station. Because of this, simultaneous transmission by two adjacent stations on the same wavelength will result in interference between those signals, resulting in substantial confusion in the field. To avoid this, it has in the past been the practice to employ plural frequency channels for communications so that adjacent base stations can communicate with their respective mobile units on different frequency channels.

In accordance with the present invention, however, only a single frequency channel is used by all base stations, with the prevention of interference being accomplished by time-division-multiplexing the communications in a disciplined manner designed to avoid such interference. A single traffic control center 28 is provided, connected to each of the base stations (by land or radio links not shown in FIG. 1) for controlling their operation. Each of the base stations is permitted to communicated with its associated mobile units only during an associated time interval, referred to hereinafter as a cycle. The control center controls the times of occurrence of these cycles so that the cycles of adjacent base stations occur at different times. On the other hand, base stations which are far apart are permitted to engage at their communication cycles at the same time, since no intereference will result.

The resulting sequencing of communication cycles is illustrated graphically in FIG. 2A. During time interval I, the base station 16 engages in its communication endeavors with its associated mobile units. Since all of the other base station service areas are adjacent to the service area of base station 16, base station 16 operates alone. The cycles of base stations 18 and 22 take place next (during time interval II). These two cycles can occur concurrently, since base stations 18 and 22 are separated by a distance great enough to insure that no interference will occur. Similarly, the cycles of base stations 12 and 24 (which occur during time interval III) take place concurrently, as do the cycles of base stations 14 and 20 (during time interval IV). This sequence of communications cycles repeat continuously, under control of the traffic control center 28.

The individual cycles need not necessarily be of the same length. The traffic control center will not initiate new communications cycles until after all of the communications cycles of the time interval have been completed. In this fashion, orderly communications takes place throughout the entire service area over a single frequency channel, substantially without interference.

During each individual communication cycle, communications are made in both directions between the associated base station and its respective mobiles. Again, if only one frequency channel is to be employed, some orderly scheme must be used to assure that no interference takes place between the communications of different vehicles and/or the base station.

Unlike the base stations, the mobile units are not directly interconnected to and controlled by a central station. Instead, all mobile stations include respective clocks, all synchronized to a similar clock in their base station. The mobile stations determine when to transmit and when to receive by referring to their clocks and to cycle information transmitted to them by the associated base station at the beginning of each cycle.

The ordering of one individual communication cycle (in this case the cycle of base station 12, which occurs during time interval III) is illustrated in FIG. 2B. As can be seen in this Figure, each cycle is divided into a series of well defined segments O-A, A-B, B-C, etc. The following is a detailed description of the various segments:

O-A: During this period, the base station transmits its own ID code, a clock calibration signal to synchronize all of the clocks in the associated mobile stations, data indicating when the various segments of the cycle are to begin, and certain other information which will be described hereinafter.

A-B: This segment is divided into a series of time slots, with there being at least as many slots as there are mobile units under the control of this base station at a given time. Each mobile unit is assigned a particular time slot and recognizes the time of occurrence of that time slot through operation of its internal clock, which was synchronized to the clocks of all other stations participating in this cycle during the interval O-A. These time slots are dynamically assigned and do not permanently belong to particular mobiles. During its associated time slot, each mobile automatically transmits certain standard information to the base station, including changes in odometer readings, changes in status of the vehicle, etc. The nature of this information will, of course, depend upon the purpose to which the system is being placed. Since the mobile only transmits if it has something to send, mobiles are often silent during their time slot. Each mobile, however, is programmed to transmit in its time slot every so often even in the absence of information requiring communication to the base station, merely to assure the base station that that mobile is still participating in its cycle.

B-C: This segment is provided for the purpose of permitting new mobile units (perhaps entering from another service area) which do not have assigned time slots but wish to participate in the communication cycles of this base station, to transmit information to the base station without interfering with other communication operations taking place during the cycle. These new mobiles will transmit their own ID code during this segment of the cycle, thereby requesting a time slot assignment so that they might engage in ordered communication with the base station. The new mobiles could transmit their I.D. codes immediately upon the opening of the time segment B-C, however then several new mobiles (each of which would be unaware of the other's presence) might find themselves transmitting I.D. codes at the same time. To avoid such conflicts, it is contemplated that new mobiles entering the cycle will each wait a random delay following the opening of the B-C time segment before beginning the transmission of their I.D. code. Since this delay is random, the chances of two new mobile units transmitting their I.D. codes at the same time interval is significantly reduced. This random delaying process also assures that, in the unlikely event that two new mobiles do provide interfering transmissions, in subsequent cycles these transmissions will not collide since the delays will have been randomly changed. The requests for participation in the cycle will be answered by the base station during the O-A segment of that base station's next subsequent cycle. During the O-A time segment the base station also transmits signals assigning time slots to each new mobile.

C-D: This time segment is included to permit a text message to be transmitted from a mobile unit to the base station, or to permit two-way voice communication between the base and a selected mobile unit. A mobile unit desiring use of this time segment will request use of it by transmitting a signal signifying this during its associated A-B time slot. The traffic control 28 selects which mobile will be permitted to use the C-D segment and cause the base station to transmit a code identifying that mobile during the E-F segment of the preceeding cycle. The particular mobile unit knows when the C-D time slot occurs since this information was transmitted by the base station during the O-A segment.

D-E: In this segment the base station confirms receipt of each of the messages transmitted by the various mobile units during their respective A-B time slots. Each mobile will retransmit its information in the next cycle of that base station unless this confirmation is made.

E-F: During this segment of the communication cycle, the base station transmits text to a selected one of the mobile units, or possibly to all of the units at the same time (a code is transmitted with the text identifying its intended destination). Also, during this interval the base station identifies the mobile unit which is to next have the use of the C-D time segment in the next succeeding communication cycle of that base station.

The segment A-B will expand or contract as mobiles are added to or deleted from the cycle. The segment B-C is always the same length. The segments C-D, D-E, and E-F are of variable length, however. In fact, a given cycle may not even include C-D and E-F segments if transmission of text is not needed.

Referring now to FIG. 3 there is shown a block diagram of the circuitry included within each of the mobile units. In the embodiment illustrated in FIG. 3, the mobile unit includes an RF transceiver of the type included as standard equipment in many fleet vehicles for the transmission of audio frequency signals to and from a base station. This RF transceiver 50 includes both transmitter and receiver circuitry, and is switchable between transmission and reception modes. The audio output from the receiver section of the transceiver is provided on an output line 52 and is normally coupled to a speaker 54. The audio input to the transmitter section of the transceiver is provided to an audio input 56, normally coupled to a microphone 58. The transceiver is responsive to a push-to-talk buttom 60 to switch between transmitting and receiving functions. When the buttom 60 is closed, the transmitter section of the transceiver 50 is supplied with power and the audio signal generated by the microphone 58 is transmitted. During this time the receiver is disconnected from the antenna. When the buttom 60 is not depressed, however, the transmitter circuitry is de-energized and the receiver is instead active.

In the FIG. 3 embodiment, the circuitry to be added to the mobile includes a microcomputer 76, a frequency-shift-keyed (FSK) modulator/demodulator 52 (referred to hereinafter as a modem) and a series of switches 64, 66, 68, and 70 for coupling the modem 62 to the transceiver 50 in place of the speaker 54 and microphone 58.

Each of the switches is formed by the contacts of an associated relay, where the relays are controlled by a series of relay drivers 72. The switch 70 is connected in series with the speaker 54 and is used to disconnect the speaker from the radio when the modem is being used to transmit or receive data. The switch 64 is in series with the push-to-talk button 60 and is used to effectively disconnect the buttom 60 from the radio when the modem is being used. The switch 66 is connected in parallel with the series combination of switches 60 and 64 and is used by the microcomputer 76 to key the transmitter when the button 60 is disconnected by switch 64. Switch 68 is a single-pole/double-throw switch having its toggle arm connected to the audio input of the radio and its contacts connected to the modem output and the microphone. The switch therefore controls the source of the signal transmitted by the radio.

The switches 64, 66, 68 and 70 are controlled by the microcomputer 76, as is the modem 62. The microcromputer 76 may be of any conventional form, and will include a microprocessor, read only memory (ROM) storing a fixed program controlling the operation of the microprocessor, random access memory (RAM) for use by the microprocessor during its normal operation, a universal synchronous/asynchronous receiver/transmitter (usually known as a USART) for communicating with the FSK modem 62, and suitable other input and output ports as required. These elements are not shown separately since their nature, construction, and operation is well known. The relays whose contacts form switches 64-70 are controlled by relay drivers 72, in turn controlled by the microcomputer 76 through a data latch 74.

Normally, the microcomputer 76 loads a data word into latch 74 such that the switches 64, 68 and 70 are in the positions shown, where the microphone and speaker are disconnected from the radio and the modem 62 connected in their place. The mode (receive or transmit) of the radio is computer controlled by control of the state of switch 66 via the data latch 74. When voice communication is required (occasionally during segment C-D, or during emergencies indicated by the operator by depressing a switch on keyboard 80) the microprocessor loads a data word into the data latch 74 causing the switches 64, 68, and 70 to change position whereby the modem 62 is disconnected and the speaker and microphone reconnected. The operator then uses the radio in the usual manner.

The FSK modem 62 receives data from the microcomputer 76 through its USART and modulates the frequency of an audio frequency carrier signal in accordance with this data. Preferably binary FSK is used, where the transmission of one frequency ("mark") denotes a logic "one" and the transmission of another frequency ("space") denotes a logical "zero". The mark and space frequencies employed may, for example, be 2100 and 1300 Hz, respectively, transmitted at a rate of 1200 baud.

The modulated RF signal received by the radio (from the base station) will be converted down to an audio frequency signal by the RF transceiver 50, and will then be converted into a serial bit stream by the FSK modem 62. The FSK modem provides this serial bit stream along with a recovered clock signal to the microcomputer 76, which converts it from a serial to a parallel format and then uses the recovered information in its programmed operation.

The system also includes a printer 78, keyboard 80 and display 82 for use in the readout of text received from the base station and for use by the operator in the assembly of text to be transmitted to the base station via the RF transceiver 50. The operator enters appropriate data through the keyboard 80, which data is temporarily displayed on the display 82 for verification of correctness. When the operator is satisfied that the text and/or data entered on the keyboard is correct, he depresses a "transmit" buttom on the keyboard 80, causing the microcomputer 76 to transmit a request to the base station for allocation of a C-D segment for transmitting the text. The microcomputer subsequently transmits the text during the allotted C-D segment via the FSK modem 62.

The vehicle may include an electrical sensor (e.g., a Hall effect magnetic sensor) connected to the odometer 84 for providing a pulse each time the vehicle travels a certain incremental distance, such as one meter or so. With each pulse provided by the odometer 84, the microcomputer 76 increments an internal counter. If the contents of this internal counter (representing the current odometer reading) changes due to movement of the vehicle, the changed reading is transmitted to the base station via the FSK modem 62 and RF transceiver 50 during the time slot associated with that mobile.

To transmit information, the microcomputer 76 loads a data word into the latch 74 causing the relay drive 72 to close switch 66. This effectively switches the transceiver 50 from a receive to a transmit mode, whereby the audio signal then supplied to the audio input 56 by the FSK modem 62 is transmitted. The microcomputer then provides serial data to the FSK modem 62 via its internal USART for transmission.

In the event that the operator wishes to have two-way voice communication with the base, the operator will depress a button on the keyboard 80 indicating this fact. The microcomputer, which periodically scans the keyboard 80, responds to the depression of this key to transmit a request for use of the time segment C-D in the next communication cycle of its base station. When the requested time segment (as granted and defined by the base station) begins, the microcomputer illuminates a light on the display 82 and loads a data word into the latch 74 to cause the switches 70 and 64 to be closed and the switch 68 to be toggled to its other position. These switch actuations effectively reconnect the microphone 58, speaker 54, and push-to-talk buttom 60 to the transceiver 50, whereby voice communications can then be carried on in a normal fashion with the base station for the duration of the C-D time segment. At the conclusion of this C-D interval the switches will automatically be repositioned in their previous positions by the microcomputer, whereby voice communications will be interrupted and the communication cycle will continue as before. Preferably the microcomputer 76 will cause the display 82 to indicate the time remaining in the C-D segment so that the operator can anticipate its termination.

Each mobile also includes an electrically settable clock 84 and a pseudorandom number generator 86. The clock is set by the microcomputer in accordance with calibration signals transmitted by the base station during the O-A segment of the communication cycle. The microcomputer thereafter monitors the clock and paces its communication cycle operations in accordance with its readings. The number generator 86 is a device providing a random number readable by the microprocessor. It may, for example, simply comprise a counter connected to a free running oscillator. Presuming that the generator 86 is read at a time bearing no special relation to the incrementing of the counter, the count at that time may be considered to be random. The counter will preferably overflow at a count corresponding to the maximum permissible length of delay DTI (see FIG. 2B).

Figure 5:
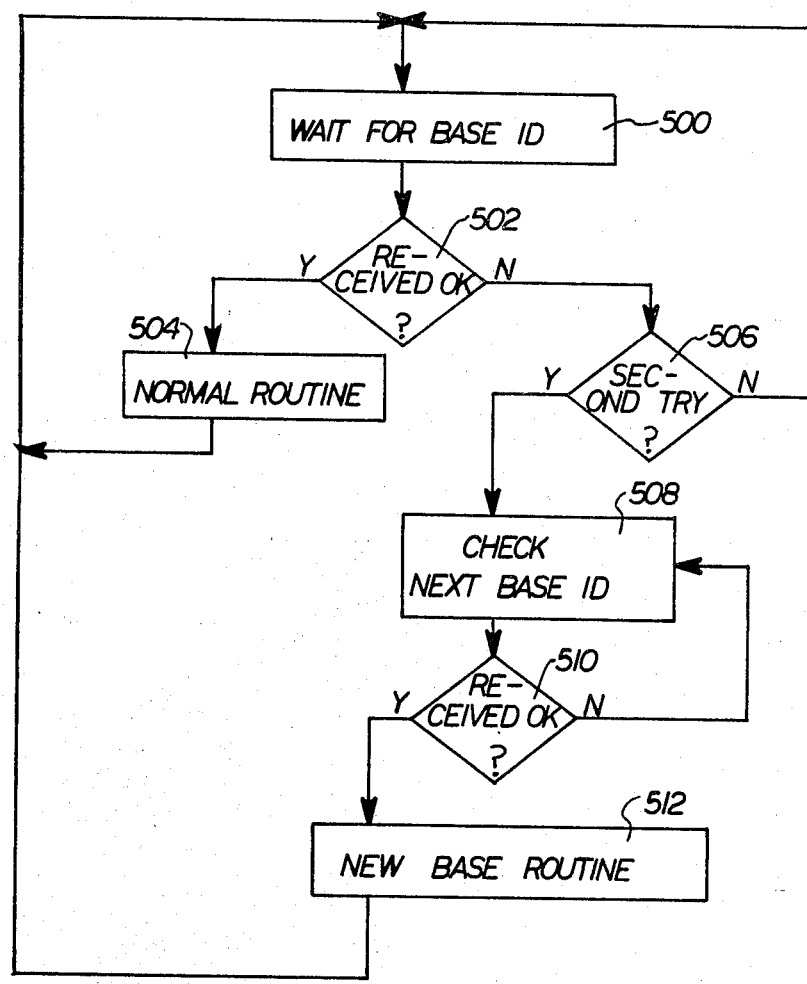

FIG. 5 illustrates the broad sequence of operations performed by the microcomputer 76 associated with each of the mobile units participating in the communications net. In step 500, the microcomputer monitors the communications being received via the RF transceiver 50 and waits for the receipt of a coded signal identifying the base station to which that mobile unit is currently assigned. The base station knows approximately when to expect receipt of this base code, since the mobile unit was advised of the anticipated time of transmission thereof during the segment O-A of the previous cycle associated with that base station.

The microcomputer 76 monitors the received signal during the O-A segment of the cycle to verify that the base identification code is properly received. This process is indicated at step 502 in FIG. 5. Correctness of the base I.D. code is determined by checking the format and content of the code received. (The code has a special format and is transmitted with one or more parity bits.) If the base code is properly received, then the microcomputer 76 proceeds with the normal communications routine, indicated at step 504 in FIG. 5. This routine is described in greater detail hereinafter with reference to FIG. 6.

If, however, the base identifying code is not properly received by the RF transceiver 50 (presumably due to inadequate signal level of the received signal), the microcomputer checks its memory to see whether or not the base identifying code was properly received in the preceeding cycle. If (step 506) the base identifying code had been properly received in the preceeding try, the base station merely returns to step 500 to wait for the next succeeding O-A segment of the communication cycle of its assigned base station. If, however, it is determined that this is the second time in a row in which the base identifying code has not been properly received, the microcomputer instead continues on to step 508 et seq., wherein it searches for and requests entry into the cycle associated with another base station.

In step 508, the microcomputer continues to monitor the output of the RF transceiver 50, looking for the base identifying code associated with another base station. In step 510 the microcomputer checks to see whether or not this base identifying code has been properly received. If it has not been, the microcomputer returns to step 508 to wait for the transmission of the base identifying code for yet another base station (transmitted, of course, during the segment O-A of the communication cycle associated with that particular base station). If the base identifying code is properly received, the microcomputer continues on with a routine identified as the "new base routine" in FIG. 5.

The routine 512 is shown in greater detail in FIG. 7, to be described hereinafter. Generally, during the new base routine the microcomputer requests entry into the communication cycle associated with the new base station whose code has just been received, and then returns to step 500 to wait for the base identifying code of that station to be transmitted the next succeeding time. Presuming that the request for entry into the communication cycle of that base station was properly received by that base station, it will transmit a confirmation of receipt of the request for entry during its next O-A segment, and will assign a particular time slot to that mobile unit. The microprocessor will store its time slot assignment in memory and then continue on with step 504, where it will engage in its normal communications routine using that time slot.

Figure 6:
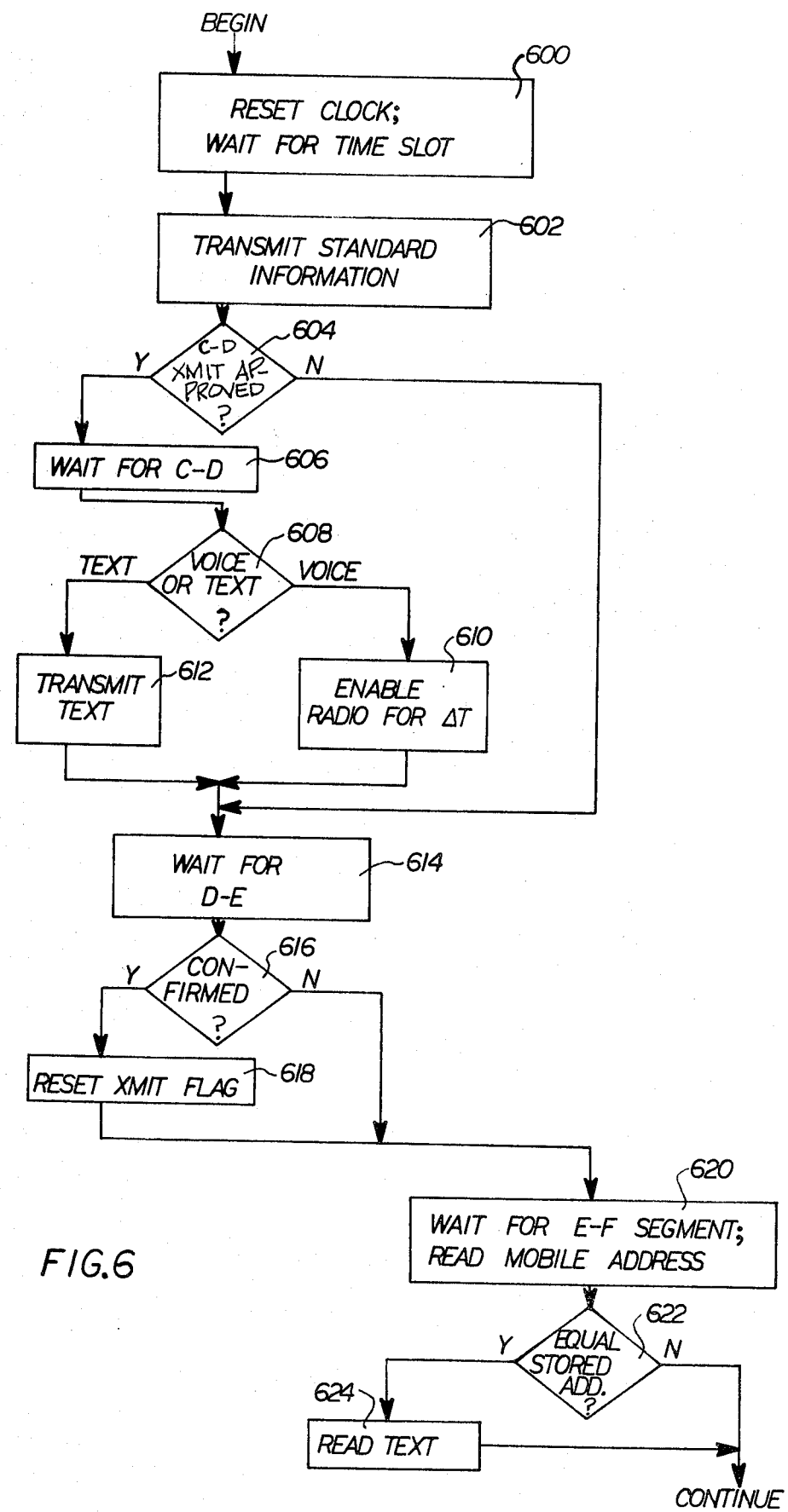

FIG. 6 illustrates in greater detail the normal communications routine carried out by the microcomputer 76 of each mobile station during its participation in the communications net. In step 600, while the communications cycle is still in the O-A segment, the microcomputer reads the clock calibration signal transmitted by the base station and synchronizes its associated clock so that all subsequent actions can be carried out in synchronism with the communications cycle. During this period the microcomputer also stores the information transmitted by the base station relating to the time at which to next expect the transmission of that base code (i.e., the time of occurrence of the O-A segment of the next cycle of that base station), the number of time slots which are being transmitted, and the length of the segment C-D of the communication cycle. These pieces of data are adequate to permit the mobile unit to fully synchronize its communications with the other mobiles in the net without interference. The microcomputer stores the information received during the O-A segment in its memory for later use.

The microcomputer then waits for its assigned time slot by periodically reading its clock 84 and comparing its reading to the known time when its time slot begins. Upon the opening of its assigned time slot, the microcomputer transmits whatever information is available to be transmitted. This information may include a code signifying that the mobile has a text message to send and requesting use of the C-D segment of the next cycle. Only other information which will be transmitted is such information as indicates a change in the status of the vehicle, movement of the vehicle by a preset increment (as indicated by the odometer circuit 84) etc.

It is common for the mobile unit to have no information to transmit during its assigned A-B time slot. The microcomputer 76, however, is programmed to transmit in its time slot at least once every preset interval, for example every fifth or sixth communication cycle, to verify to the base station that the mobile unit has not moved outside of the range of transmission of that base station.

In step 604 the microcomputer 76 checks its memory to recall whether the base station communicated a signal during the period O-A indicating that this mobile station was authorized to transmit text during the time segment C-D. If approval was not granted by the base station, the microcomputer proceeds on to step 614. Otherwise, the microcomputer continues with step 606, wherein it waits for the opening of the C-D segment of the communication cycle. When the clock 84 associated with microcomputer 76 indicates that the time C in the communication cycle has arrived, the microcomputer 76 checks whether voice or text is to be transmitted (step 608) and then proceeds to either transmit the text (step 612) or to enable voice communications for a time interval corresponding to the length of the C-D segment, as previously indicated by the base station during the O-A segment of this cycle (step 610).

The text which is to be transmitted in step 612 consists of textual material assembled by the operator and entered into the microcomputer 76 via the keyboard 80. It will be appreciated that the microcomputer is continually servicing the printer 78, keyboard 80 and display 82 during the course of the communication cycle being described herein. Thus, the events which are being described with respect to FIGS. 5, 6 and 7 do not occupy the full attention of the microcomputer 76 since they occur at a relatively slow rate compared to the cycle time of the microcomputer. The microcomputer thus has time remaining for servicing of the various peripheral devices connected thereto. These servicing functions will not be described in detail hereinafter since the these functions are well understood, and readily implemented and would therefore needlessly complicate the description.

Upon the conclusion of the voice/text communication interval (C-D segment), the microcomputer (in step 614) monitors the signals being transmitted by the base station to determine whether or not the base station has included therein a confirmation of receipt of information during that mobiles associated time slot of the A-B segment. If no transmission was made by the mobile during its associated time slot, then of course no confirmation will be forthcoming. If some information was transmitted during its associated time slot, however, then a confirmation will be expected. Upon the receipt of a confirmation, the microcomputer will reset an internal flag, thereby preventing retransmission of the same information which had been transmitted during this time slot. In the event that no confirmation is received from the base station during the D-E segment, however, the flag will not be reset and the same data will be retransmitted in the next communication cycle of its associated base station.

In step 620 the microcomputer 76 continues to monitor information received from the base station during the segment E-F. It is possible that the base station has no need of transmission of textual material during this segment, in which case the segment will simply be deleted. If, however, textual material is available to be transmitted from the base to one or all of the mobile stations, then a particular code will be transmitted by the base station at the beginning of this segment, identifying the mobile unit to which that textual material is addressed or indicating that all mobiles are to receive it. In step 620 the microcomputer 76 reads that address. In step 622 the mobile unit compares the received address with its own address. If the address corresponds to its own address, or if the code is a special code indicating that all mobile units are to receive the textual material which follows, the microcomputer continues on to step 624 wherein the textual material received thereafter is read and printed out on the printer 78. The microprocessor then returns to step 500 (see FIG. 5) to await the opening of the O-A segment associated with the next communication cycle of its particular base station. The mobile will ignore the intervening communications cycles of other base stations.

Figure 7:
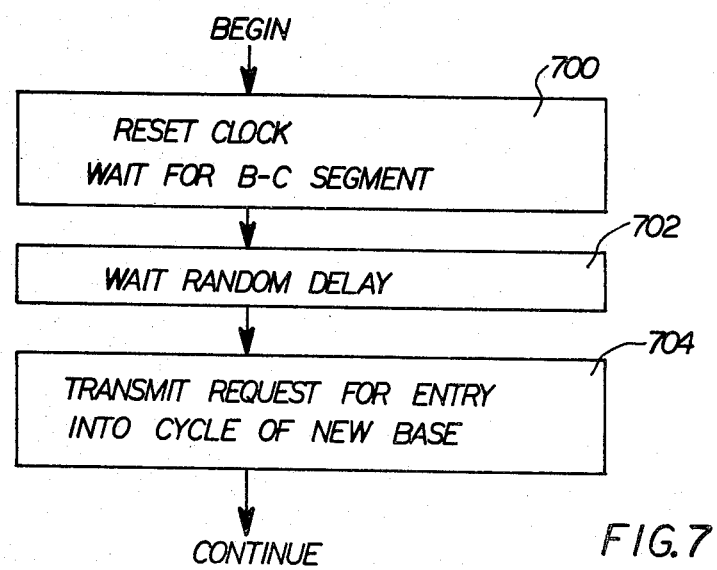

FIG. 7 illustrates in somewhat greater detail the steps performed by the microcomputer 76 during the "new base routine" indicated as block 512 in FIG. 5. The purpose of this routine is to transmit a request for entry into a communication cycle associated with a base station other than the base station to which that mobile unit is currently assigned. In step 700 the microcomputer synchronizes its clock to the calibration signal transmitted by the new base station during its O-A transmission segment. The microcomputer also reads the signals transmitted by that base station describing the time boundaries of the segments being employed in the coming cycle. This permits the microcomputer to determine when the segment B-C of the communication cycle first opens. The microcomputer then monitors the output of its clock 84, waiting for the opening of the B-C segment of the communication cycle.

At time B the microcomputer 76 reads the random number then present at the output of pseudo-random number generator 86, and waits for a time interval corresponding to this random number. The delay (indicated at DT1 in FIG. 2B) is inserted to insure that a second mobile also requesting entry into the communication cycle during this B-C segment will not transmit its request at the same time. Usually, two mobile units requesting entry into the communication cycle during a given B-C segment will employ different delays (indicated in FIG. 2B as delays DT1 and DT2) since the numbers read from their respective pseudo-random number generators are effectively random and will thus usually be different. The transmissions of the two mobiles will therefore probably not collide with one another.

In step 704, after the delay, the microcomputer transmits its request for entry into the cycle of the new base station. This request may consist of nothing more than the identifying code of that mobile station. The microcomputer then returns to step 500 (FIG. 5) to wait for the next successive communication cycle of that new base station.

Presuming that the new base station did accurately receive the request for entry by that mobile, it will transmit (during the O-A segment) a signal indicating the acceptance of that mobile unit into its communication cycle, as well as a signal assigning a particular time slot to that mobile unit. That mobile unit will proceed to carry out the normal communications routine with the new base station in the ordinary manner described heretofore. If the mobile does not receive the acceptance signal during the O-A segment it will return to the new base routine 512 and request entry a second time. If this also fails, the mobile will return to step 508 and look for another base.

Figure 4:
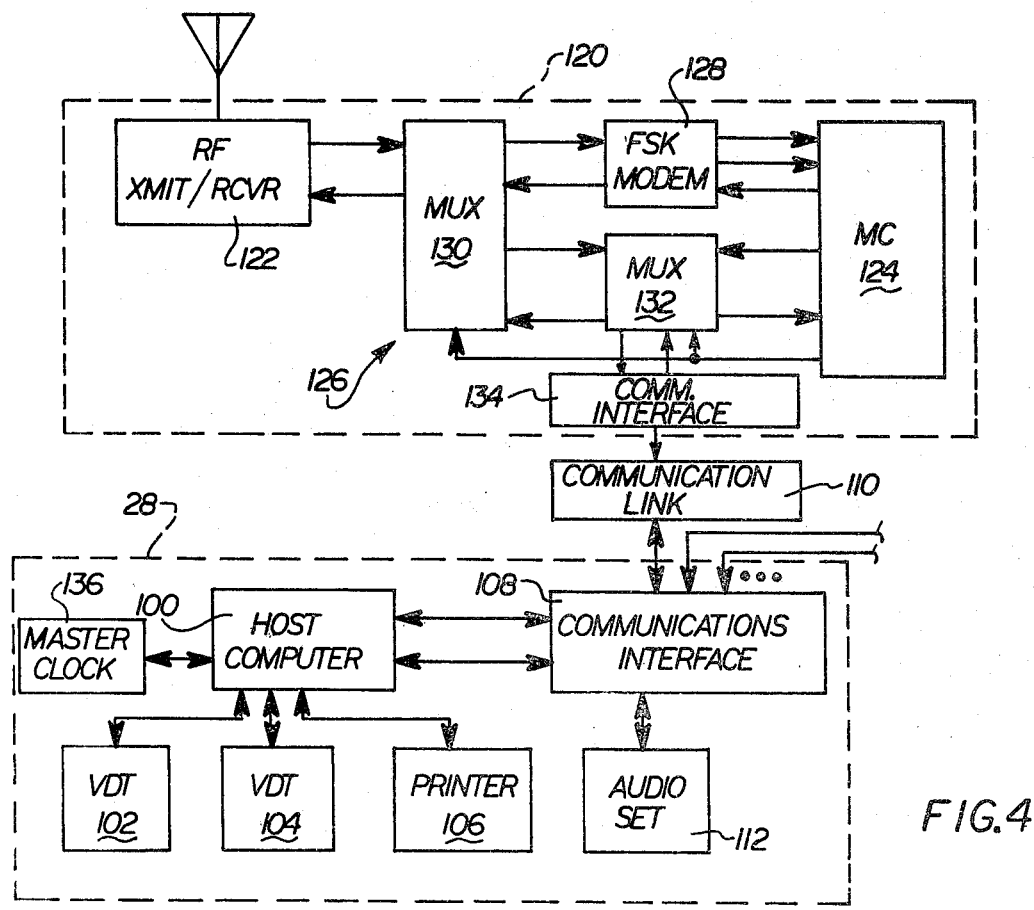
FIG. 4 is a block diagram of the base station and central traffic control circuitry; and, FIGS. 5-8 are block diagrams useful in understanding the sequences of operations performed by the mobiles and base stations to implement the communication cycles schematically represented in the timing diagrams of FIGS. 2A and 2B.

FIG. 4 is a block diagram of the circuitry associated with one of the base stations 120, and also shows a general block diagram of the traffic control center 28 which controls the operation of the various base stations. As shown in FIG. 4, the traffic control center includes a host computer 100 coupled to video display terminals 102 and 104 which provide operator access to the system. An operator will be seated at each of these terminals for overseeing the operation of the system. The operator can review the information transmitted from the plural mobile stations and transmit appropriate textual messages to the individual vehicles, as described previously. A printer 106 is also be included for providing hard copy of the systems operation data.

The host computer 100 communicates with the various base stations through a communications interface 108 which provides a separate communications link 110 to each of the various base stations. Although digital data will normally be communicated over the various communications links 110 through the communications interface 108, occasionally two-way voice communications will be carried instead. The voice communications will be separated out by the communications interface 108 and directed to one or more audio sets 112. Each audio set 112 consists of a microphone and suitable speaker or headphone arrangement for use by an operator seated at one of the video display terminals 102 or 104.

FIG. 4 also illustrates a block diagram of one possible embodiment of a base station 120 which may be coupled to the traffic control center via the communications link 110. The base station 120 is illustrated in FIG. 4 as including an RF transmitter/receiver 122, coupled to a microcomputer 124 (similar to microcomputer 76) through a suitable coupling arrangement 126. This coupling arrangement includes an FSK modem 128, similar to the FSK modem 62 shown in FIG. 3, which translates the digital serial bit stream generated by the microcomputer 124 into a frequency-shift-keyed signal for transmission by the RF transmitter/receiver. The FSK modem 128 also responds to the FSK signal received by the RF transmitter/receiver 122 to demodulate that signal and generate therefrom a serial bit stream and associated clock signal, both of which are provided to serial input ports of the microcomputer 124.

Since bidirectional voice communications are to be carried out over the radio channel occasionally, the coupling network 126 includes a multiplexer 130, controlled by the microcomputer 124, for coupling the input and output of the RF transmitter/receiver 122 to either the FSK modem 128 or to a second multiplexer 132. When audio communications are being conducted over the RF channel (during some C-D segments or during emergencies, for example), the microcomputer 124 will cause the multiplexer 130 to connect the input and output lines of the RF transmitter/receiver 122 to the two inputs of the communications interface multiplexer 132. This multiplexer, which is controlled in common with a multiplexer 130, then provides these two signals directly to the communications interface 134 in place of other connections to the microcomputer 124. Normally, however, the microcomputer 124 will provide control signals to the multiplexers 130 and 132 which cause the audio input and output of the RF transmitter/receiver 122 to be directly coupled to the corresponding output and input of the FSK modem 128, and the serial input and output ports of the microcomputer 124 to be coupled to the communications interface 134.

Figure 8:
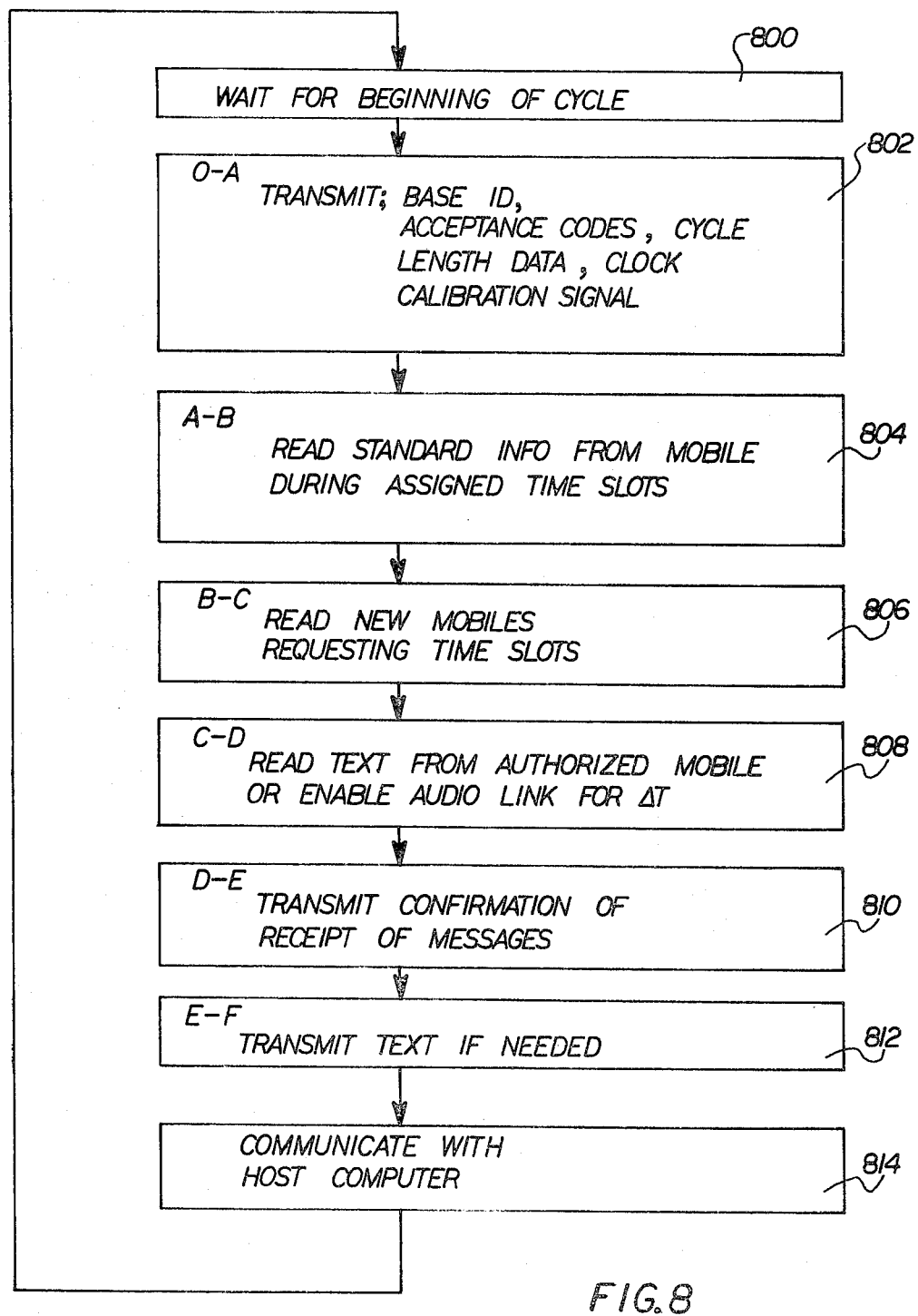

FIG. 8 is a flow chart illustrating in outline form the nature of the operations performed by the microcomputers 124 associated with each base station. In the illustrated step 800 the microcomputer is waiting for the beginning of its communication cycle. Each microcomputer 124 includes an internal clock which is synchronized to the operation of all other clocks in the system, and more particularly to a master clock 136 located at the host computer 100. Prior to this time the microcomputer 124 will have been loaded with data from the host computer 100; this data will identify the time when the base station should initiate its communication cycle. When its internal clock (not shown separately here) indicates that the time has arrived for it to initiate its communication cycle, the microcomputer proceeds on to step 802. In step 802, the RF transmitter is keyed and a modulated audio signal provided thereto through the FSK modem 128. The data which is thus transmitted includes the following:

(1) a base station identification code;

(2) signals identifying the new mobile units which are to be incorporated into its communication cycle pursuant to requests made by those units in a preceding cycle;

(3) time slot assignments for the new mobile units;

(4) data indicating the total number of time slots in the A-B segment to follow;

(5) data indicating the length of the C-D segment of the communication cycle;

(6) the expected times of occurrence of the O-A segments of the next two subsequent communciation cycles associated with that base station; and (7) calibration signals for synchronizing the clocks of the various mobile units assigned to that base station. Suitable synchronizing signals will, of course, also be transmitted with this data.

In step 804 the microcomputer 124 switches the RF transmitter/receiver 122 into a receive mode, and monitors the serial bit stream received by the receiver from the various mobile station in their respective time slots during the A-B segment of the communication cycle. The information transmitted from the various mobile units is stored in local memory for subsequent communication to the host computer. The computer 124 also keeps track of the time slots in which information had been received so that confirming signals can be sent to the corresponding mobile units during the D-E segment which follows.

In step 806 the microcomputer 124 monitors the output of the RF transmitter/receiver 122 (during the B-C segment) and reads any mobile unit identifying codes transmitted during this period. These mobile unit identifying codes correspond with mobile units requesting entry into the communication cycle and thus requesting time slots. If the computer 124 is successful in reading the identifying codes of these mobile units, it will assign time slots to these mobile units, and will transmit identifying codes and time slot assignments to these mobiles during the O-A segment of its next communication cycle.

If, in the preceeding communication cycle, the base station had not authorized the use of the C-D segment by any of the mobile units, then the C-D segment will be omitted and the communication cycle will proceed on with the D-E segment. If a mobile has been authorized to use the C-D segment during this communication cycle, however, the microcomputer 124 will continue to monitor the output of the receiver/transmitter 122, storing in memory the text received from the designated mobile unit during this segment. If, in the preceeding communication cycle the microcomputer 124 had authorized a two-way voice link up with a particular mobile unit during the C-D segment, the microcomputer 124 will cause the multiplexers 130 and 132 to connect the input and output of the radio 122 to the communications interface 134 and thus to the traffic control center 98. The microcomputer will also automatically interrupt this voice link at the conclusion of the C-D segment.

The timing and duration of the C-D segment was determined by the host computer 100 previously, and down loaded to the microcomputer 124 prior to entering into the present communication cycle. (This information had then been transmitted to the mobile unit involved during the O-A segment of the communication cycle under way.) The host computer, knowing this timing information, then automatically causes the communication interface 108 to couple the audio set 102 to the communication link at the proper time and for the proper duration.

During the D-E segment of the communication cycle the microcomputer 124 of the base station transmits coded signals confirming the receipt of messages from each of the mobile units which had transmitted information during its respective time slot, and which had been successfully received by the base station. This operation is represented as step 810 in FIG. 8.

As stated previously, the E-F segment is reserved for use in the transmission of textual material to a selected one of the mobile stations, or perhaps to all of the mobile units simultaneously. In step 812, the microcomputer 124 locates the beginning of the E-F segment, and then transmits the desired textual material during that period. This textual material will have initially been assembled by an operator of one of the video display terminals 102, 104, etc., and will have been down loaded into the microcomputer 124 from the host computer 100 via the communications link 110. After the transmission of this textual material, the communication cycle of this base station is completed and other, adjacent base stations may begin their communication cycles. In the step 814 the microcomputer 124 communicates with the host computer 100 via the communications link 110, advising it of the completion of its communication cycle and requesting down loading of information for subsequent communication cycles The host computer 100 operates in a managerial capacity to determine the parameters of each communication cycle (timing and duration) and to control the sequencing of the cycles. It operates, more particularly, to:

(1) read data from the base stations and assemble it in memory in a format compatible for use by the operators of the video display terminals;

(2) mediate the use of the C-D and E-F segments of each cycle by downloading not only text and mobile I.D.'s (for the E-F segments) but also authorizations to particular mobile stations to use the C-D segment and data indicating the permitted duration of that segment. (The requests for use of the C-D segments are preferably granted on a first-requested, first-granted basis);

(3) determine, based upon the decision as to how long the C-D and E-F segments are to be and the known lengths of the other segments, when all concurrently operating cycles will be concluded and hence when the next cycles may begin; and (4) downloading cycle initiation information into the base stations.

The host computer 100 examines the data downloaded from the various base stations via the respective communications links and determines which of the base stations, if any, are to be permitted to utilize the C-D segment for voice communication in the communication cycles which take place thereinafter. The host computer determines the length of the C-D segments which will be permitted, based upon how busy the communications links 110 are at that time. If the communications links are very busy, then the C-D segments will be rather short, or will be omitted entirely. If very little information is passing over the communication links 110, however, the C-D segments can be made very long. The host computer 100 communicates the desired length of the C-D segment and the identifying code of the mobile units which will be permitted to use this segment in at least the next succeeding communication cycle, and perhaps in several additional communication cycles thereafter as well. The host computer 100 also conveys to the microcomputer 124 any textual material assembled by an operator on a video display terminal 102 which is to be transmitted to one or more of the mobile units in succeeding communication cycles, together with the identifying code of the mobile to which the text is directed.

In the event of an operator emergency in one of the mobile units, the operator of that mobile will depress an "emergency" button on the keyboard 80 associated with that mobile. The microcomputer 76 of that mobile unit responds to this emergency button depression by immediately suspending other operations and causing the RF transceiver 50 to transmit a special emergency code and the identifying code of that mobile unit. The microcomputer 76 continuously transmits this information for a period long enough to insure that its associated base station has had ample opportunity to monitor the communications channel and receive the emergency code and the mobile identifier. The microcomputer 76 then automatically loads a data word into the data latch 74 so as to change the positions of the switches 64, 68 and 70, to couple the RF transceiver 50 to its microphone 58 and speaker 54. The operator can then engage in normal voice communications over the RF transceiver. Meanwhile, the base station 120, having received the emergency code and the mobile identifier, communicates the fact of an emergency to the host computer 100 and causes the multiplexers 130 and 132 to connect the output of the RF transmitter 122 directly into the communication interface 134 and thus to the traffic control station 98. This immediately connects the voice communications channel to an operated associated with one of the video display terminals, whereby voice communication is immediately established between the traffic control center and the mobile unit.

Although the invention has been described with respect to a preferred embodiment, it will be appreciated that various rearrangements and alterations of parts may be made without departing from the spirit and scope of the invention, as defined in the appended claims.

What is claimed is:

1. Apparatus for use with a fleet vehicle adapted to participate in a single frequency time division multiplexed communications systems wherein each of plural participating vehicles communicates data to a central station in a respective assigned time slot of a multiple time slot, cyclically recurring communication cycle, wherein said central station transmits synchronizing information in a predetermined time slot of each communication cycle, and wherein requests by nonparticipating fleet vehicles for participation in the communication system are communicated to the central station during another predefined time slot in the communication cycle, said apparatus comprising clock means for measuring time intervals to identifying the time slots associated with said cyclically recurring communication cycle, transceiver means for receiving said synchronizing information from said central station, means for synchronizing said clock means to said cycle in accordance with said synchronizing information, and control means responsive to said clock means and actuatable to initiate participation in said communication cycle by causing said transceiver means to transmit a request for participation in said cycle to said central station a random period after the beginning of the time slot in which said requests are to be communicated, wherein said random delay has a maximum duration which is no greater than the length of said time slot.

2. Apparatus as set forth in claim 1, wherein said control means is responsive to time slot allocation signals transmitted by said central station for thereafter causing said transceiver means to transmit standard information to said central station during its assigned time slot.

3. Apparatus as set forth in claim 2, wherein said control means causes said transceiver means to transmit said standard information to said central station only when there is a change in said information or when no other transmission has been made to said central station by that vehicle for more than a preset time period, said preset time period being substantially greater than the time from the beginning of one of said communication cycles to the beginning of the next succeeding cycle.

4. Apparatus as set forth in claim 1, wherein said control means comprises a computer programmed to control said transceiver means in accordance with timing signals provided by said clock means.

5. Apparatus as set forth in claim 1, wherein there are plural geographically spaced said central stations, each transmitting and receiving on the same frequency but in communication cycles which are spaced in time so as to be nonoverlapping, and wherein said control means includes means for automatically determining when communication with its respective central station is degraded and for then automatically requesting participation in the communication cycle of a different said central station.

6. Apparatus for communicating information between a central station and plural fleet vehicles, comprising first communications means associated with a central station, said first communications means including a master clock, transceiver means for receiving and transmitting signals over a single frequency channel, and control means responsive to said master clock for controlling said transceiver means to establish a cyclically recurring communication cycle between said central station and said fleet vehicles, said control means causing said transceiver means to transmit synchronizing information to said fleet vehicles in first periodically occurring time slots of said communication cycle for synchronizing their operation to said communication cycle, and to receive standard information from said fleet vehicles in second periodically occurring time slots, wherein each fleet vehicle participating in said communication cycle is assigned a respective one of said time slots and wherein nonparticipating fleet vehicles request assignment of a said second time slot by transmitting a request for one of said second time slots in a third said time slot allocated for that purpose, said control means being responsive to time slot allocation requests received in said third time slots for assigning one of said second time slots to said requesting fleet vehicles and for transmitting information identifying said assigned time slots to said requesting fleet vehicles, and a plurality of second communications means, each associated with a respective one of said fleet vehicles, each said second means including transceiver means, clock means for identifying the time slots of said cyclically recurring communication cycle, means for receiving said synchronizing information from said central station and for synchronizing said clock means to said cycle in accordance with said synchronizing information, and control means responsive to said clock means for, when seeking participation in said cycle, causing a request for participation to be transmitted a random delay after the beginning of said third time slot, said control means being respective to information transmitted from said central station which identifies the time slot assigned to said fleet vehicle for thereafter causing said transceiver means to transmit said standard data during its assigned time slot of said communication cycle.

7. Apparatus as set forth in claim 6, wherein there are plural said first communications means each associated with a respective one of plural geographically spaced said central stations, wherein said plural first means all operate on the same frequency channel, and wherein means are provided for controlling the cycle timing of said plural first communications means such that none of the said time slots associated with one of said central stations overlaps any time slots of a geographically adjacent central station.

8. Apparatus as set forth in claim 7 wherein each said second communications means includes means for determining when communication between it and the central station with which it is communicating has become degraded, and for then requesting participation in the communication cycle of a different said central station.

* * * * *

UNITED STATES PATENT AND TRADEMARK OFFICE
CERTIFICATE OF CORRECTION

PATENT NO. : 4,414,661
DATED : November 8, 1983
INVENTOR(S) : Krister Karlstrom

It is certified that error appears in the above–identified patent and that said Letters Patent are hereby corrected as shown below:

Column 17, line 21, change "respective" to - - responsive - -.

Signed and Sealed this

Third Day of January 1984

[SEAL]

Attest:

GERALD J. MOSSINGHOFF

Attesting Officer     Commissioner of Patents and Trademarks